May 22, 1962  A. F. DYER  3,035,609

FLUID HANDLING STRUCTURE

Filed Jan. 2, 1958  3 Sheets-Sheet 1

INVENTOR.
A. F. DYER

BY *Hudson and Young*

ATTORNEYS

INVENTOR.
A.F. DYER

BY Hudson and Young

ATTORNEYS

3,035,609
FLUID HANDLING STRUCTURE
Alvah F. Dyer, Bartlesville, Okla., assignor to Phillips Petroleum Company, a corporation of Delaware
Filed Jan. 2, 1958, Ser. No. 706,864
6 Claims. (Cl. 137—506)

This invention relates to a fluid handling structure. In one aspect this invention relates to a hydrant valve structure adapted to permit flow therethrough in either direction.

At the present time, there is a trend to replace the familiar aircraft servicing tank truck with a fueling system comprising underground conduits supplying fuel from a central storage and pumping facility to a plurality of fuel hydrants located at parking stations on the air field. In such a fueling system small mobile servicing trucks, having metering and filtering means thereon and provided with suitable connections which connect with said fuel hydrant and the aircraft, are employed at said parking stations. The fuel is delivered from the hydrant through said metering and filtering means on the service truck and then into the aircraft. In most instances both the truck conduit connecting to the hydrant and the hydrant outlet itself are provided with valves which close automatically when said truck conduit and said hydrant are separated. Although said servicing truck is generally provided with emergency shutdown means, it is desirable that means be provided to shut off flow at the hydrant under emergency conditions. It is also desirable that the hydrant valve be adapted to permit flow in either direction so as to accommodate both fueling and defueling operations.

An object of this invention is to provide an improved fluid handling structure. Another object of this invention is to provide an improved fluid handling structure having valve means therein adapted to permit flow therethrough in either direction. Another object of this invention is to provide an improved fluid handling structure having valve means therein adapted to be operated by the pressure of the fluid flowing through said structure regardless of the direction in which said fluid is flowing. Another object of this invention is to provide a hydrant valve particularly adapted to be employed in a hydrant fueling system for the fueling and defueling of aircraft. Another object of this invention is to provide a hydrant valve adapted to be employed in aircraft fueling operations and provided wtih emergency shutdown means. Another object of this invention is to provide a fluid handling structure having valve means therein adapted to permit flow therethrough in either direction and provided with emergency shutdown means operable regardless of the direction in which the fluid is flowing. Other aspects, objects, and advantages of the invention will be apparent to those skilled in the art in view of this disclosure.

Figure 2:
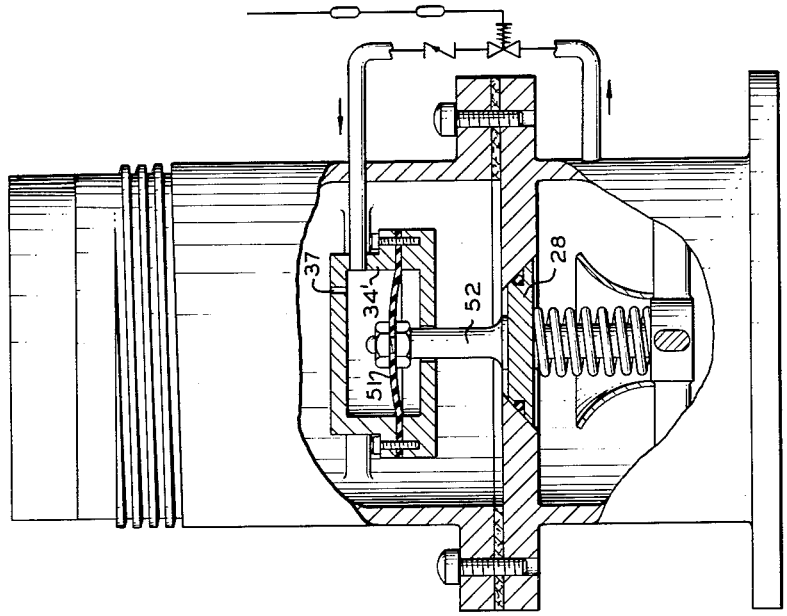
FIGURE 2 illustrates a modification of the fluid handling structure shown in FIGURE 1.

Referring now to the drawings, the invention will be more fully explained by describing a modification thereof which is particularly adapted to be employed as a hydrant valve in a hydrant system for fueling and defueling of aircraft. The modification illustrated in FIGURE 1 comprises a tubular housing 10 having a first end 11 and an opposite end 12 adapted to be connected with fluid handling conduits as by threads 13 at said first end 11 and flange 14 at said second end 12. A first transverse wall member 15 extends across said housing 10 at end 11 and is attached thereto by means of bolts 17. An inwardly facing valve seat 16 is axially disposed in said first wall member. Any other suitable means for mounting a valve seat in the end of housing 10 can be employed. A first poppet valve 18 is adapted to seat in said first valve seat 16. O-ring 19 provides a seating surface on said poppet valve 18. A valve stem 21, attached to said poppet valve at one end, is slidably mounted in a guideway 22 supported within said housing 10 by a plurality of support members 23 attached thereto and to the inner wall of housing 10. Spring means 24, mounted around said valve stem 21 and bearing against guideway 22 and poppet valve 18, is adapted to bias said poppet valve to a closed position.

Second wall member 26 extends transversely across said housing adjacent end 12 thereof. A second valve seat 27 is axially disposed in said wall member 26. A second poppet valve 28 is adapted to seat in said valve seat 27. A valve stem 29, attached at one end to said second poppet valve 28, is slidably mounted in a second guideway 31 axially supported within said housing by a plurality of support members 32 attached thereto and the inner wall of said housing. Second spring means 33, mounted around said valve stem 29 and bearing against guideway 31 and second poppet valve 28, is adapted to bias said poppet valve 28 to a closed position.

A pressure responsive means comprising a cylinder 34 is supported wtihin said housing 10 by means of support members 36 at a point between said first valve seat 16 and said second valve seat 27. A first bleed port 37 is provided in one end of said cylinder. A piston 38 is slidably engaged in said cylinder. The area of said piston is larger than the area of poppet valve 28. A piston stem 39 is attached at one end to one side of said piston, extends without the end of said cylinder which is adjacent said second poppet valve 28, and is attached at its other end to said poppet valve 28 by means of bolt 41. The opening in the wall of cylinder 34 through which piston stem 39 extends provides a second bleed port 42. Said cylinder 34 could be open on the side adjacent second poppet valve 28 if desired. However, it is preferred that it be closed as shown in order to prevent fluid which is flowing through housing 10 in a direction from end 12 to end 11 from impinging piston 38. Deflector 43, attached to guideway 31, can be provided to deflect flowing fluid toward the inner wall of housing 10 and thus minimize impingement of said flowing fluid on the under surface of second poppet valve 28, if desired.

A conduit 44 is connected to said cylinder 34 and communicates with the interior of said cylinder at a point beyond the point of maximum travel of piston 38 when poppet valve 28 is closed. Said conduit 44 extends without said housing 10 and around wall member 26 to a point within said housing between said wall member 26 and end 12 of said housing. A check valve 46 is disposed in said conduit 44 and is adapted to permit only one-way flow therethrough, i.e., from end 12 of housing 10 to cylinder 34. A spring loaded normally closed pilot valve 47 is disposed in said conduit 44. Lanyard 48, having fusible links 49 therein is attached to the stem of said pilot valve 47 and can be employed to hold said valve open from a remote position.

In the fluid handling structure illustrated in FIGURE 2, piston 38 has been replaced with flexible diaphragm 51 mounted in and extending transversely across a modified cylinder 34' as shown. A stem 52 is attached at one end to said diaphragm 51 and at the other end to second poppet valve 28. The remainder of the elements in the apparatus of FIGURE 2 are like those of FIGURE 1.

Figure 3:
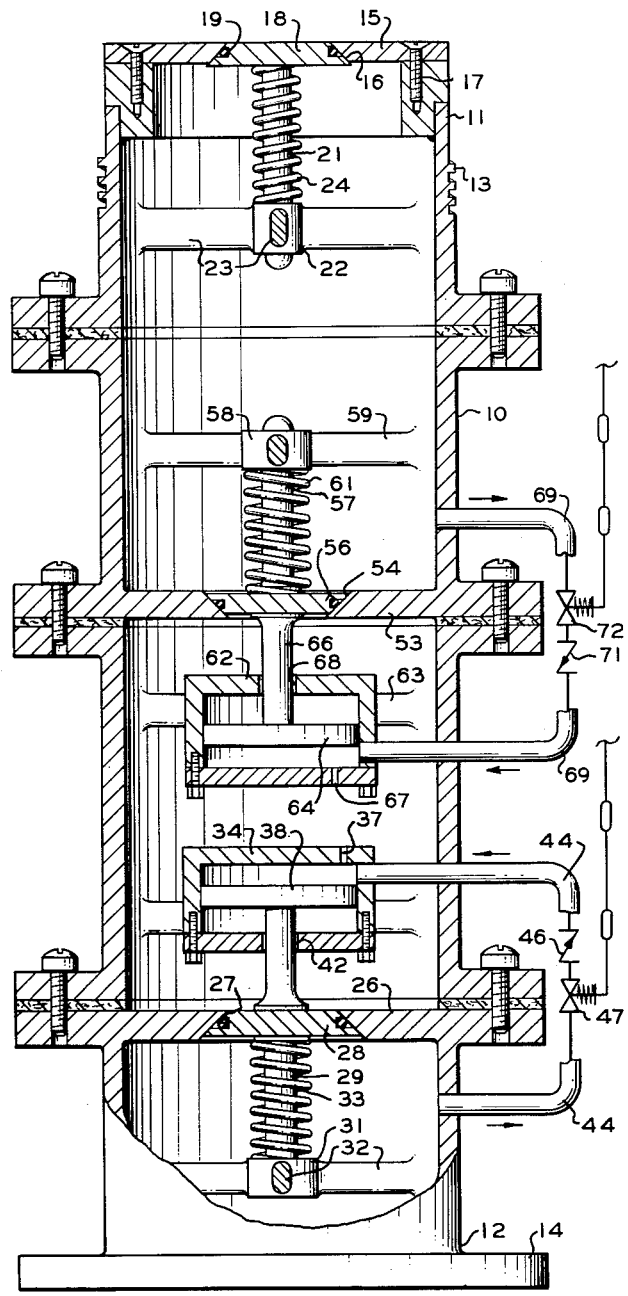
FIGURE 3 illustrates a modification of the fluid handling structure of the invention adapted to permit flow in either direction and provided with emergency shutdown means operable regardless of the direction in which the fluid is flowing.

In the fluid handling structure illustrated in FIGURE 3, a third transversely disposed wall member 53 extends across said housing 10 at a point intermediate said first transverse wall member 15 and said second transverse wall member 26. A third valve seat 54 is axially disposed in wall member 53. A third poppet valve 56 is adapted to seat in said third valve seat 54. A valve stem 57 is attached at one end to said third poppet valve 56 and is slidably mounted at its other end in a third guideway 58 supported within said housing 10 by support members 59. Spring 61 mounted around valve stem 57 and bearing against guideway 58 and poppet valve 56 is adapted to bias said poppet valve 56 to a closed position in valve seat 54. A second cylinder 62 is supported within housing 10 by means of support members 63 between said first cylinder 34 and said third wall member 53. It will be noted that cylinder 34 is also disposed between second wall member 26 and third wall member 53. A second piston 64 is slidably engaged in second cylinder 62. Piston stem 66 is attached at one end to one side of piston 64, extends without the end of cylinder 62 which is adjacent said third poppet valve 56, and is attached at the other end to said poppet valve 56. Bleed ports 67 and 68 are provided in opposite ends of cylinders 62 in the same manner as bleed ports 37 and 42 for cylinder 34.

A second conduit 69 is attached to second cylinder 62 and communicates with the interior of said cylinder 62 at a point beyond the maximum travel of piston 64 when poppet valve 56 is closed. Said conduit 69 extends without housing 10 and around third wall member 53 to a point within said housing 10 between wall member 53 and end 11 of said housing 10. A second check valve 71, adapted to permit one-way flow only in a direction from end 11 of housing 10 around wall member 53 and to cylinder 62, is disposed in conduit 69. A second spring loaded pilot valve 72 is disposed in said conduit 69. The remainder of the elements of the apparatus illustrated in FIGURE 3 are like those in the apparatus illustrated in FIGURE 1.

Figure 4:
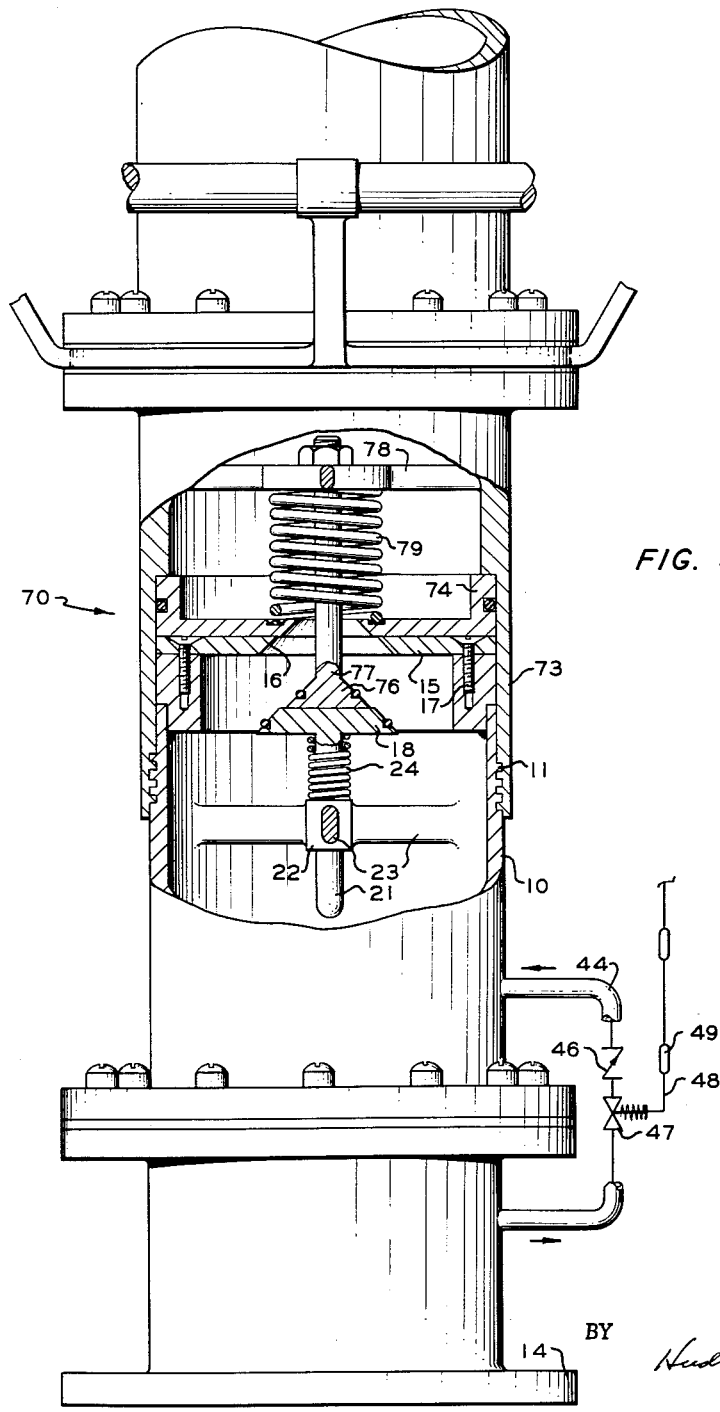
FIGURE 4 illustrates the fluid handling structure of either FIGURE 1 or 2 employed as a hydrant valve and in combination wtih a mating coupling.

Referring now to FIGURE 4 there is shown a mating coupling 70 attached to housing 10 at threads 11. Said mating coupling comprises a body 73 having a valve seat 74 slidably mounted in the end thereof as shown. A poppet valve 76 is fixed within the body 73 by means of stem 77 attached to support members 78 as shown. Spring 79 bearing against support member 78 and attached (as by welding) to said valve seat 74 is adapted to bias said valve seat 74 to a position against poppet valve 76 and thereby close the end of body 73. As here shown, valve seat 74 has been pushed upwardly and away from poppet valve 76 by the action of wall member 15 as coupling 70 was threaded onto housing 10. At the same time valve 76, being fixed, bears against poppet valve 18 in housing 10, compresses spring 24, and thus moves valve 18 away from valve seat 16.

Figure 1:
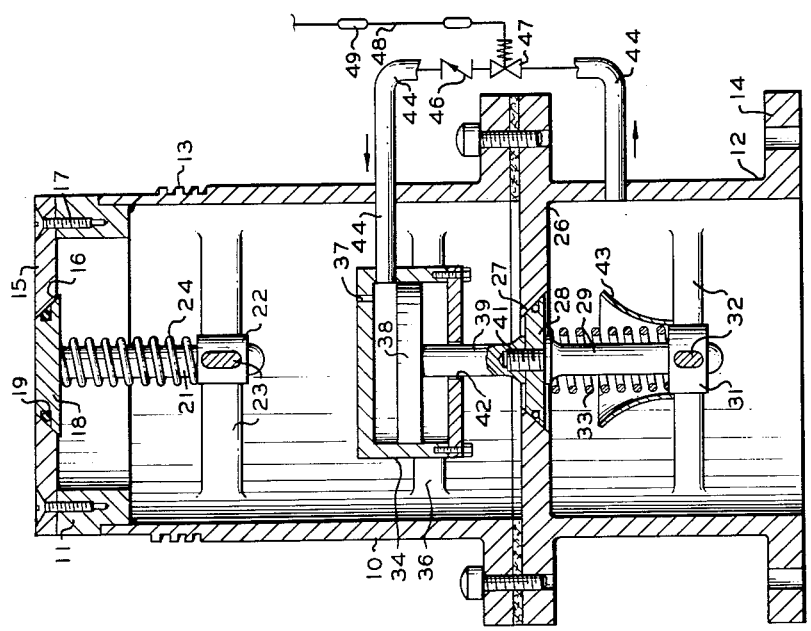
FIGURE 1 is a cross section of one modification of the fluid handling structure of the invention adapted to permit flow therethrough in either direction and provided with emergency shutdown means.

In operation of the apparatus illustrated in FIGURE 1, assuming that mating coupling 70 (FIGURE 4) has been coupled to housing 10, poppet valve 18 is biased to an open position by poppet valve 76 as shown in FIGURE 4, housing 10 has been connected at 14 to a hydrant (not shown) and fuel is being pumped into end 12 of said housing, opening of pilot valve 47 by lifting lanyard 48 will permit flow of said pump fluid through conduit 44 into cylinder 34. The diameter of port 37 is small compared to the diameter of conduit 44, thus fluid flow through conduit 44 will cause a build-up of pressure in cylinder 34 and since piston 38 has a larger area than poppet valve 28, the pressure of the fluid flowing through conduit 44 will move piston 38 downward and thus open poppet valve 28 permitting flow of fluid through housing 10 from end 12 to end 11. Said flow will continue so long as pilot valve 47 is held open. This type of flow and operation would be employed in aircraft fueling when the fluid handling structure of the invention is employed in a hydrant fueling and defueling system with housing 10 connected to a hydrant (not shown) at 14 and mating coupling 70 (FIG. 4) is connected at its other end by suitable conduit means to an aircraft (not shown).

If for any reason an emergency arises, and it is necessary to stop flow as soon as possible, release of lanyard 48 will cause spring loaded pilot valve 47 to close whereupon pressure within cylinder 34 is released through port 37, equalizing the pressure on both sides of piston 38 and spring 33 will cause poppet valve 28 to close. During fueling operations, lanyard 48 can be secured in a taut position to hold pilot valve 47 open. Fusible links 49 will melt and part in the event of a fire which would automatically cause pilot valve 47 to close and shut down the fueling operation as described.

On defueling operations, i.e., when fluid is being pumped from the aircraft and the flow of fluid through housing 10 is from end 11 toward end 12, check valve 46 prevents flow of fluid through conduit 44. Fluid pressure is equalized on both sides of piston 38 through ports 37 and 42, the pressure of the pumped fluid overcomes the action of spring 33, and poppet valve 28 is opened to permit flow of fluid through housing 10 from end 11 to end 12. Valve 28 thus acts as a spring loaded check valve.

It is believed that the operation of the apparatus of FIGURE 3 will be apparent to those skilled in the art in view of the explanation given for the apparatus shown in FIGURE 1. On fueling operations, i.e., flow of fluid from end 12 to end 11 of housing 10, the operation of cylinder 34 and piston 38 is the same as that described in connection with FIGURE 1. Fluid pressure exerted against piston 64 is balanced through ports 67 and 68, and the pressure of the pumped fluid opens poppet valve 56 to permit flow of fluid through housing 10. On defueling operation, spring loaded pilot valve 72 is held open and fuel flows through conduit 69 to cylinder 62 and fluid pressure is applied to piston 64 which causes valve 56 to open. Check valve 46 in conduit 44 prevents flow of fuel through conduit 44 and fluid pressure in cylinder 34 is balanced through ports 37 and 42, and pressure of the pumped fluid overcomes spring 33 causing valve 28 to open. In the event of an emergency during defueling operations, closing of pilot valve 72 will stop the flow of fuel through conduit 69. The pressure on both sides of piston 64 will then be equalized by means of ports 67 and 68 and spring 61 will cause poppet valve 56 to close whereupon flow of fuel will be stopped. When flow of fuel stops, no more pressure is exerted on valve 28 and the pressure on both sides of piston 38 will be equalized through ports 37 and 42, and spring 33 will cause poppet valve 28 to close.

It is believed that the advantages of the invention will be apparent to those skilled in the art in view of the above detailed description. The invention provides a fluid handling structure which can be employed in a conduit, such as a fueling and defueling conduit, to control flow of fluid in either direction. If desired, emergency shutdown means can be provided for one direction only by employing the modification illustrated in FIGURES 1 and 2. If, however, emergency shutdown means are desired for flow of fluid in either direction then the apparatus illustrated in FIGURE 3 can be employed. It is believed evident that the fluid handling structure of the invention is compact, can be readily installed, and easily maintained. Another important advantage of the invention is that the valving actions are fast acting. It is only a matter of seconds, even at high flows, before the poppet valves are closed, once the pilot valves are closed.

While in the apparatus illustrated in FIGURE 3, cylinders having slidably engaged pistons therein have been employed as the pressure responsive means adapted to open poppet valves 28 and 56, it will be apparent to those skilled in the art that the pressure responsive means of FIGURE 2 comprising diaphragm 51, instead of piston 38, can be employed. It will be noted that pistons 38, piston 64, and diaphragm 51 have a larger area than poppet valves 28 and 56.

While port 37 in cylinder 34 and port 67 in cylinder 62 are small in diameter compared to the diameters of conduits 44 and 69 respectively so that pressure build-up will occur in said cylinders as mentioned above, said ports 37 and 67 are large enough to vent said cylinders in a relatively short time.

While the invention has been described in terms of a hydrant valve adapted for use in fueling and defueling of aircraft, the invention is not limited to such use.

Various other modifications of the invention will be apparent to those skilled in the art in view of the above disclosure. Such modifications are within the spirit and scope of the invention.

I claim:

1. A fluid handling structure comprising: a tubular housing having first and second opposite ends adapted to be connected with fluid handling conduits; a first valve seat at said first end of said housing; a first poppet valve supported within said housing, normally biased to seat in said first valve seat, and adapted to be mechanically opened when a mating coupling is connected to said first end of said housing; a second poppet valve supported within said housing and normally biased to seat in a second valve seat adjacent said second end of said housing; a third poppet valve supported within said housing and normally biased to seat in a third valve seat disposed within said housing intermediate said first and said second valve seats; first pressure responsive means supported within said housing between said second and said third valve seats and adjacent said second valve seat, said first pressure responsive means being connected to and adapted to open said second poppet valve; second pressure responsive means supported within said housing between said second and said third valve seats and adjacent said third valve seat, said second pressure responsive means being connected to and adapted to open said third poppet valve; first conduit means connected to said first pressure responsive means and said housing and adapted to provide one-way communication only from a point within said housing adjacent said second end thereof, around said second valve seat, and to said first pressure responsive means; and second conduit means connected to said second pressure responsive means and said housing and adapted to provide one-way communication only from a point within said housing adjacent said first end thereof, around said third valve seat, and to said second pressure responsive means.

2. A fluid handling structure according to claim 1 wherein said first conduit means comprises: a first conduit operatively connected to said first pressure responsive means and extending therefrom around said second valve seat to a point within said housing adjacent said second end thereof; a first check valve in said first conduit and adapted to permit flow from said housing to said first pressure responsive means only; and a first pilot valve, normally biased to closed position, in said first conduit for controlling fluid flow through said first conduit to said first pressure responsive means; and said second conduit means comprises: a second conduit operatively connected to said second pressure responsive means and extending therefrom around said third valve seat to a point within said housing adjacent said first end thereof; a second check valve in said second conduit and adapted to permit flow from said housing to said second pressure responsive means only; and a second pilot valve, normally biased to closed position, in said second conduit for controlling fluid flow through said second conduit to said second pressure responsive means.

3. A fluid handling structure according to claim 1 wherein each of said first and said second pressure responsive means comprises: a cylinder provided with end walls each having a bleed port therein; a piston slidably engaged in said cylinder; and a piston stem attached at one end to one side of said piston and extending without said cylinder to connect with the said poppet valve said pressure responsive means is adapted to open.

4. A fluid handling structure according to claim 1 wherein each of said first and second pressure responsive means comprises: a cylinder provided with end walls each having a bleed port therein; a flexible diaphragm mounted in and extending across said cylinder; and a stem attached at one end to said diaphragm and extending without said cylinder to connect with the said poppet valve said pressure responsive means is adapted to open.

5. A fluid handling structure according to claim 2 wherein each of said first and said second pressure responsive means comprises: a cylinder provided with end walls each having a bleed port therein; a piston slidably engaged in said cylinder; and a piston stem attached at one end to one side of said piston and extending without said cylinder to connect with the said poppet valve said pressure responsive means is adapted to open.

6. A fluid handling structure according to claim 2 wherein each of said first and second pressure responsive means comprises: a cylinder provided with end walls each having a bleed port therein; a flexible diaphragm mounted in and extending across said cylinder; and a stem attached at one end to said diaphragm and extending without said cylinder to connect with the said poppet valve said pressure responsive means is adapted to open.

References Cited in the file of this patent

UNITED STATES PATENTS

| Number | Name | Date |
| --- | --- | --- |
| 165,791 | Clemens | July 20, 1875 |
| 848,951 | Stocker | Apr. 2, 1907 |
| 1,087,399 | Phelps | Feb. 17, 1914 |
| 1,380,030 | White | May 31, 1921 |
| 2,016,460 | Sorensen | Oct. 8, 1935 |
| 2,487,418 | Birkemeier | Nov. 8, 1949 |
| 2,587,539 | Seaman | Feb. 26, 1952 |
| 2,638,916 | Scheiwer | May 19, 1953 |
| 2,761,469 | Hansen | Sept. 4, 1956 |
| 2,774,373 | Fievet | Dec. 18, 1956 |
| 2,830,784 | Placette | Apr. 15, 1958 |